United States Patent [19]

Sonoda et al.

[11] Patent Number: 4,762,742
[45] Date of Patent: Aug. 9, 1988

[54] PERPENDICULAR MAGNETIC RECORDING MEDIUM

[75] Inventors: Tomiya Sonoda, Machida; Takashi Hikosaka, Tokyo; Hiroki Nakamura, Kawasaki, all of Japan

[73] Assignee: Kabushiki Kaisha Toshiba, Kawasaki, Japan

[21] Appl. No.: 945,549

[22] Filed: Dec. 23, 1986

[30] Foreign Application Priority Data

Dec. 25, 1985 [JP] Japan .................. 60-295059

[51] Int. Cl.⁴ .............................................. G11B 5/64
[52] U.S. Cl. .................................. 428/141; 427/131; 428/694; 428/900
[58] Field of Search .............. 428/141, 143, 694, 900; 427/131

[56] References Cited

U.S. PATENT DOCUMENTS 4,567,083  1/1986  Arioka et al. ................. 428/141
4,645,703  2/1987  Suzuki et al. .................. 428/141

*Primary Examiner*—Paul J. Thibodeau
*Attorney, Agent, or Firm*—Finnegan, Henderson, Farabow, Garrett and Dunner

[57] ABSTRACT

A perpendicular magnetic recording medium comprises a base having a main surface and form, and a magnetic layer formed on the main surface, and having a recording surface, formed with a number of fine projections, and a susceptible axis substantially perpendicular to the recording surface. The projections are distributed so that the difference between a height level corresponding to an area ratio of 1.0%, obtained when the projections are cut by an imaginary plane parallel to the recording surface, and another height level corresponding to an area ratio of 99.0%, obtained in a like manner, ranges from 40 to 600 Å. A protective film of a substantially uniform thickness is formed on the recording surface of the magnetic layer.

7 Claims, 3 Drawing Sheets

PERPENDICULAR MAGNETIC RECORDING MEDIUM

BACKGROUND OF THE INVENTION

The present invention relates to a perpendicular magnetic recording medium, which utilizes remanent magnetism, in a direction perpendicular to its plane, for improving its recording density.

As a typical example of the perpendicular magnetic recording medium of this type, there is a floppy disk in which a thin film of a cobalt-chromium alloy, having an axis of easy magnetization in a direction perpendicular to its plane, is formed as a magnetic recording layer on a base, by batched or continuous sputtering. The base is formed of a heat-resistant polymer film, such as polyimide or polyethylene terephthalate. The recording layer is formed of a cobalt-chromium alloy film, or an oxide film having a magnetoplumbite-type crystal structure, such as barium ferrite or strontium ferrite. In a recording system using floppy disks, the medium rotates generally at a speed of 300 to 600 rpm. Reading or writing operations are performed by means of a magnetic head in contact with the medium, utilizing the effect of electromagnetic exchange. When using the floppy disks in a perpendicular magnetization system for higher recording density, especially linear recording density, it is necessary to reduce the distance between the magnetic head and noncontacting surface portions, attributable to the irregularities of the surface of the medium which is traced by the head. Although generally regarded as even or nearly-even, the surface of the medium actually has very fine indentations. The shape of these indentations greatly influences the characteristics of the medium, including the durability, dropout, linear recording density, and stick.

However, the surface roughness of the medium for high recording density is grasped only very vaguely. For example, recording media have been proposed whose arithmetical mean deviation of the surface roughness profile Ra and maximum projection height Rmax are highly regulated. The media may be apparently equivalent in values Ra and Rmax, within a predetermined range of measurement. However, a duration test indicates some variations in characteristics of the media. Material dust of the media or protective layer, attributable to abrasion, accumulates on the magnetic head, thus widening the space between the media and head, and possibly damaging the medium surface. As a result, the media are lowered in life performance, as well as in reading and writing characteristics. In particular, the damage to the media is subject to substantial variations, resulting in lower reliability.

Moreover, the perpendicular magnetic recording system for high-density recording is confronted by some technical problems to be solved before it can start to be used practically. Primarily, the surface of the magnetic layer of the media must be brought more closely into contact with the magnetic head. In the recording system of this type, the irregularity of the media surface is liable to lower the frequency response, and cause reduction or change of output during writing.

If the medium surface is too smooth, however, the magnetic head will stick to the medium, thus losing its mobility. Thus, the perpendicular magnetic layer cannot be used practically, due to such antinomy, as well as the microscopic configuration of the medium surface, which can not easily be detected by conventional perpendicular measuring means.

SUMMARY OF THE INVENTION

The object of the present invention is to provide a perpendicular magnetic recording medium, in which the best surface configuration can be obtained with use of a novel method of indication, thus avoiding the aforementioned problems of the conventional recording media.

In general, the life performance of a perpendicular magnetic recording medium depends considerably on the state of contact between medium and magnetic head. As the contact state varies, the frictional force between medium and head changes, and the wear rate of the medium surface varies.

The state of contact between a magnetic head and a floppy disk will now be studied microscopically. As shown in FIG. 1, a ring-type head was supposed to be used as the magnetic head. The portion of this head that contacts the medium is in the form of a spherical surface of 50 to 80 (mm) R, and is formed with head gap 21 for recording/reproducing operation and erase gap 22.

The medium surface has configurations such as waveness warps, indentations, and the like. The floppy disk, which generally is interposed between two magnetic heads or between a magnetic head and a pad, is always subjected to a fixed load. The load counteracts the influence of undulations and waveness, so that only the irregularities that are present influence the state of contact between the medium surface and the magnetic head. FIG. 2 shows the roughness property of a cobalt-chromium perpendicular magnetic layer, with its undulations and warps removed.

If a head load of 10 gr is applied to the medium, the head comes into contact, at its spherical surface portion with a diameter of approximately 0.15 mm, with the surface of the medium. The head load acts directly on the projections of the medium surface. If only one of the projections is subjected to the load, then it receives a weight of several thousand kg or more. As a result, the projection is deformed or broken. Value Rmax corresponds to the height of the highest projection. The projections are deformed or broken successively, according to height, until they are able to stand the load. When the load becomes endurable, that is, when the load and the density of deformed or broken projections are balanced, the magnetic head slides on the projections. Thereupon, the life of the medium depends on the wear rate.

The pieces separated from the broken projections and/or magnetic layer, which remain as foreign matter on the medium, are liable to produce scratches on the medium surface. For higher durability, therefore, the medium surface must be formed with a number of projections of uniform height. Preferably, the tip end of each projection should be round.

In order to grasp the medium shape quantitatively, it is advisable to consider a height level which corresponds to an area ratio of 1.0%, as mentioned later with reference to FIG. 3. The more projections there are of the height level corresponding to the 1.0% area ratio, the sharper the tops of each projection are. Preferably, the density of projections at this height level is 400 pieces/0.1 mm$^2$ or less. The shape of the projections can be also represented by the difference between height levels corresponding to area ratios of 1.0% and 5.0%.

The greater the difference, the sharper the projection tops are. Preferably, the difference is 120 Å or less.

Preferably, moreover, the height level corresponding to the 1.0% area ratio is 40 to 600 Å above a height level corresponding to an area ratio of 99.0%. If the difference between the two height levels is more than 600 Å, the space between the medium and magnetic head will be too wide. If the difference is less than 40 Å, the head will stick to the medium.

The method of indicating the surface configuration of the medium will now be described. FIG. 3 shows curves representing the roughness of the surface of an example of the perpendicular magnetic recording medium. In FIG. 3, numerals 31 and 32 designate valleys and peaks, respectively. If the bottom of deepest valley 31a, within the range of measurement, is regarded as a reference plane, every point on the medium surface can be represented by a height above valley 31a.

Information on the surface roughness can be obtained by producing a number of such roughness curves at predetermined intervals. If those peaks 32 rising above height level H are cut parallel to the medium surface at level H, cut ends or sections S with their respective areas appear. The shape of the projections and distribution of their height levels can be indicated by combining the total area ratio, heights, and the number of sections S on a plurality of cutting planes. The area ratio is a value compared to the area of the medium surface, as viewed on the level of deepest valley 31a. The projections may also be cut at height level Hs which corresponds to the area ratio of 1.0%.

In the above description, the height levels are based on deepest valley 31a as the reference plane. The depth of valley 31a, however, depends on the presence of unusually deep defects, which may exist in some subject regions for measurement, and may not in others.

Accordingly, that height level corresponding to the area ratio of 99.0% can be regarded as the deepest level for the reference plane, which is hardly influenced by the presence of any unusual hollows. The height level corresponding to the 1.0% area ratio is an average height level of the projections which cannot be influenced by the presence of unusually high projections. Also, this level corresponds to a plane for an indication of the shape and height distribution of the peaks of the projections, which are essential factors for the measurement of durability, in particular.

DETAILED DESCRIPTION OF THE PREFERRED EMBODIMENTS

Four embodiments of the present invention will now be described in detail.

(EXAMPLE 1)

A plurality of heat-resisting films or bases were prepared. The main surface of each base was finely worked to change its roughness. A cobalt-chromium magnetic layer of a substantially uniform thickness was formed on the irregular main surface by sputtering. Thus, a plurality of perpendicular magnetic recording media were manufactured in which the recording surface of the magnetic layer is substantially as irregular as the base surface.

Figure 6:
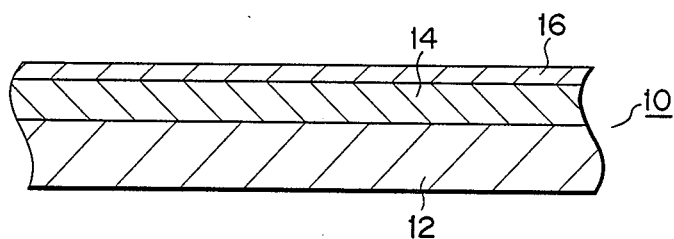
FIG. 6 is a sectional view of an example of a perpendicular magnetic recording medium.

FIG. 6 is a sectional view of an example of the perpendicular magnetic recording media formed in the aforesaid manner. In FIG. 6, cobalt-chromium magnetic layer 14 is formed on heat-resisting film 12, thus constituting perpendicular magnetic recording medium 10.

The heat-resisting film was finely roughed in the following manner.

A polyimide film of 75-$\mu$m thickness was used as the base, and the surface of the base was subjected to 5 minutes of sputtering, in a mixed gas atmosphere of oxygen and argon, at a pressure of $5 \times 10^{-3}$ torr. After evacuating the gas, the base surface was subjected to another 5 minutes of high-frequency sputtering, in argon gas at $5 \times 10^{-3}$ torr, so as to be roughened. The roughness of the film surface depends on the partial pressure of oxygen; the more oxygen, the rougher the surface. A smooth surface was obtained by repeatedly running a corundum dummy head, which is finished with use of a #3,000 abrasive, and has a spherical surface of 100 mm R.

The perpendicular magnetic recording media, manufactured in the aforesaid manner, were examined for the relationship between relative output and the difference between height Hs, corresponding to an area ratio of 1.0%, and a height corresponding to a 99.0% area ratio, on the condition that the area ratio of the deepest surface is 100%.

Figure 2:
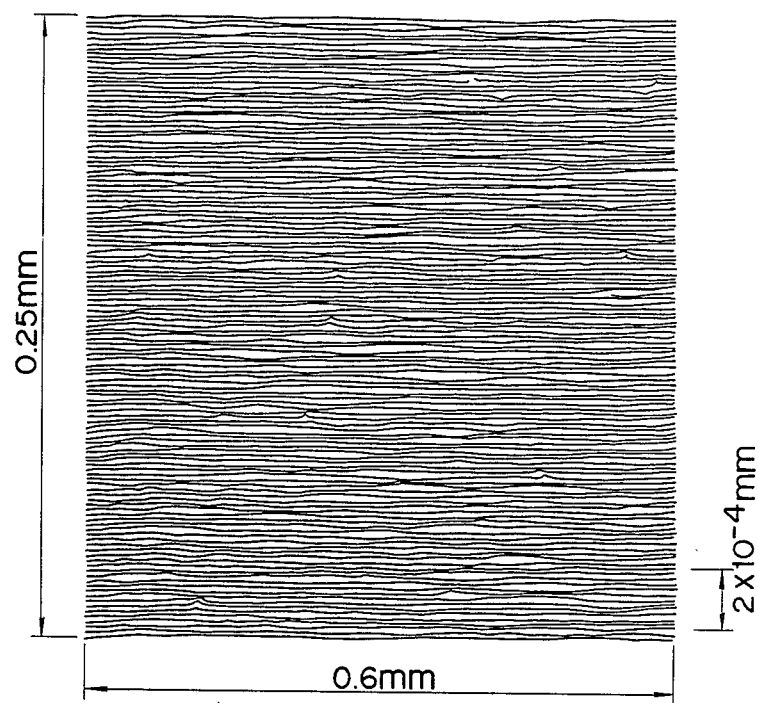
FIG. 2 is a plan view of a cobalt-chromium sputtered film showing a result of measurement of its surface roughness.
Figure 1:
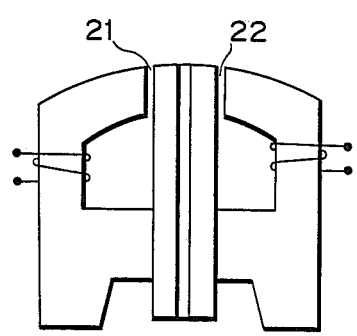
FIG. 1 is a front view showing a ring-type magnetic head.
Figure 3:
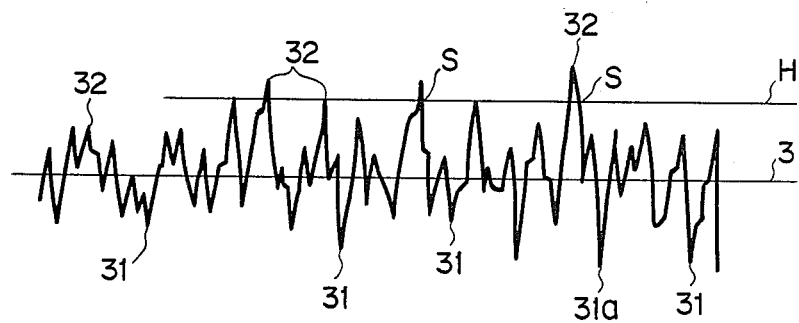
FIG. 3 is a graph showing a result of measurement of surface roughness for illustrating an embodiment of the present invention.
Figure 4:
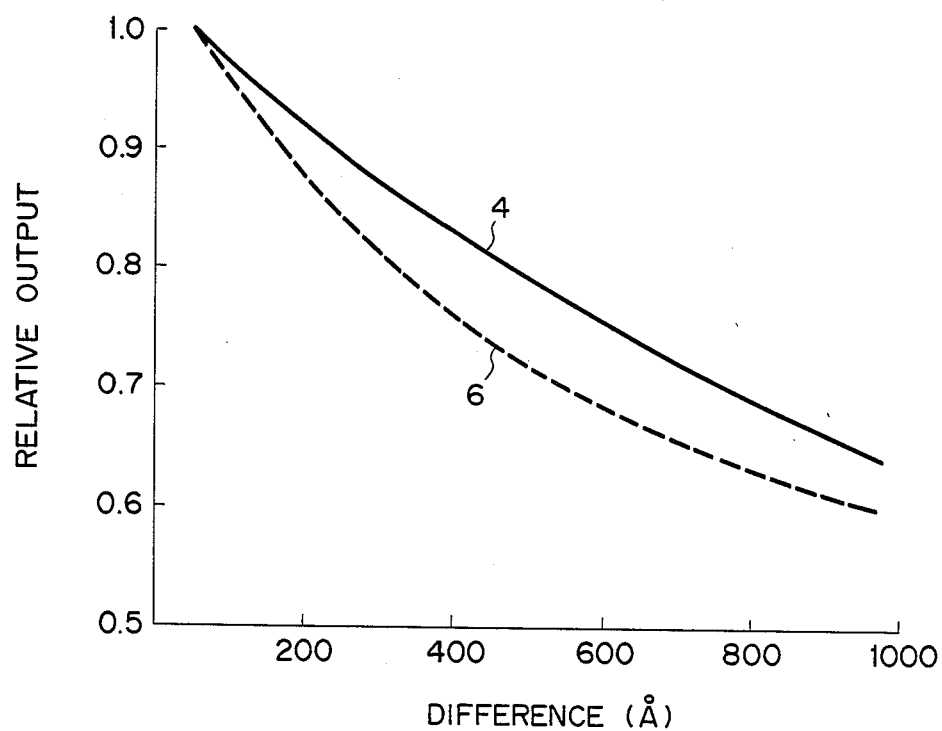
FIGS. 4 and 5 show characteristic curves showing results of experiments for illustrating the embodiment of the invention.

The examined recording media were 3.5-inch floppy disks, which were used with a ring-type magnetic head. In this example, the difference between the heights corresponding to the area ratios of 1.0% and 99.0%, as a criterion for the relative output, was 40 Å. The surface roughness of each recording medium was measured by means of a diamond probe of 2-$\mu$m R and 30-mg probe load. In doing this, the samples were fixed on a stage, composed of a roughness gage and a stepping motor. After covering a predetermined length, the probe was returned to its original position, whereupon the stage was moved by the stepping motor. Thus, the surface roughness was measured within an area of 0.2 mm$^2$, with a cutoff value of 0.25 mm, for each sample. After the measurement, measurement data were stored successively into a computer, and were subjected to necessary correction, such as removal of elements indicative of inclination and undulation. In FIG. 4, showing the measurement results, the axis of the abscissa represents the difference between the heights corresponding to the area ratios of 1.0% and 99.0%, while the axis of the ordinate indicates the relative output. Curves 4 and 6 represent cases where the recording frequency is 50 KBPI and 70 KBPI, respectively. These curves indicate that if the height difference is 600 Å or more, the relative output is 0.7 or less at 70-KBPI frequency, and that if the difference is 400 Å or more, the relative output is also 0.7 or less at 50-KBPI frequency. In view of the output and frequency characteristics, the height difference should preferably be less than 600 Å. When the difference was less than 40 Å, more specifically, when it was 35 Å, the magnetic head stuck to the media.

In the embodiment described above, the perpendicular magnetic recording media mainly use an alloy of cobalt and chromium for the magnetic layer. Alternatively, however, barium ferrite, strontium ferrite, or any other suitable materials may be used for the magnetic layer. As shown in FIG. 6, moreover, protective layer 16 of a substantially uniform thickness may be formed on the surface of the magnetic layer. Also in this case, magnetic recording media with satisfactory frequency and output characteristics can be obtained, provided the requirements of the present invention for the surface roughness are fulfilled.

(EXAMPLE 2)

Floppy disks with a 3.5-inch diameter, having cobalt-chromium magnetic layers different in surface roughness, were prepared by the same method as described in connection with Example 1. These perpendicular magnetic recording media were examined for the incidence of dropout, and the density of those projections rising to height levels above a reference plane, at height Hs corresponding to the 1.0% area ratio. This projection density is equivalent to the density of sections obtained when the projections are cut on the level of the reference plane. The incidence of dropout was 45% or less of the average output.

Figure 5:
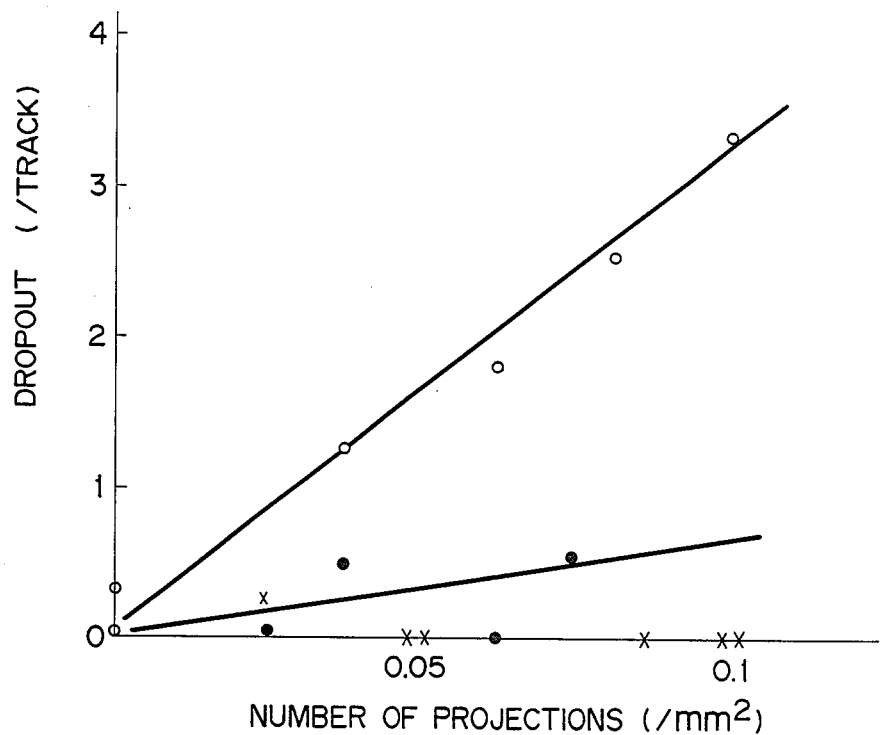

In FIG. 5, showing the measurement results, the axes of the abscissa and the ordinate represent the density or number of projections per unit area and the incidence of dropout, respectively. Circles indicate those projections which rise to levels more than 800 Å above height Hs, while black spots indicate those projections whose height levels range from 700 to 800 Å above height Hs. Crosses indicate those projections whose height levels are within 600 Å above height Hs. The projections with height levels more than 800 Å above height Hs, which corresponds to the 1.0% area ratio, have a great influence on the incidence of dropout, and the projections that are 700 Å above height Hs are correlative to the dropout. The projections that are 600 Å above height Hs, however, have no effect on the incidence of dropout. In the perpendicular magnetic recording media, therefore, the projections that are more than 800 Å, preferably more than 700 Å, above height Hs should be removed thoroughly. Those recording media which fulfill this requirement hardly suffered any dropout.

In the embodiment described above, the perpendicular magnetic recording media mainly use an alloy of cobalt and chromium for the magnetic layer. Alternatively, however, other cobalt-based alloys, barium ferrite, strontium ferrite, or any other suitable materials may be used for the magnetic layer. Moreover, a protective layer may be formed on the surface of the magnetic layer. Also in this case, magnetic recording media with less dropout can be obtained, provided the requirements of the present invention for the surface roughness are fulfilled.

(EXAMPLE 3)

Floppy disks with a 3.5-inch diameter, having cobalt-chromium magnetic layers different in surface roughness, were prepared by the same method as described in connection with Example 1. These media were measured for the surface characteristic, wear rate, and durability. Table 1 shows the results of the measurement.

TABLE 1

| Sample | Difference between levels corresponding to area rations of 1.0% and 5.0% (Å) | Wear rate (Å/500,000 passes) | Durability (10,000 passes) |
| --- | --- | --- | --- |
| A | 25 | 5 | 700 |
|   | 30 | 5 | 600 |
| B | 50 | 10 | 540 |
|   | 55 | 20 | 390 |
| C | 100 | 28 | 350 |
|   | 120 | 30 | 300 |
| D | 220 | 50 | 290 |
|   | 230 | 75 | 200 |
| E | 400 | 90 | 150 |
|   | 420 | 100 | 120 |

The surface roughness was obtained by the aforementioned method. The wear rate was obtained by measuring the thickness of the protective layer before the durability measurement and after 1,000,000 passes, utilizing ellipsometry. The durability test was conducted with use of a rotational frequency of 300 rpm and head load of 12 gr. The expiration of the life of the media was set at the point of time when the output was lowered to 70% of the initial output.

As seen from the results of Table 1, the wear rate was found to be relatively low when the difference between height levels corresponding to the area ratios of 1.0% and 5.0% was within 120 Å. In this condition, the durability obtained was 3,000,000 passes or more.

(EXAMPLE 4)

Five polyimide films of different surface characteristics were used as film bases, and a cobalt-chromium alloy (20% by weight) was deposited to a thickness of 0.5 μm, on each base, by sputtering. Silicon dioxide was deposited to a thickness of 200 Å by sputtering, thus forming a protective layer. Thus, ten film samples, two for each individual surface characteristic, were prepared. They were measured for the surface characteristic, dynamic frictional force, and durability. Table 2 shows the results of the measurement.

TABLE 2

| Sample | Density of projection at level corresponding to area ratio of 1.0% (per 0.1 mm$^2$) | Dynamic frictional force (gr) | Durability (10,000 runs) |
| --- | --- | --- | --- |
| A | 180 | 0.05 | 700 |
|   | 200 | 0.07 | 580 |
| B | 310 | 0.09 | 550 |
|   | 330 | 0.10 | 410 |
| C | 400 | 0.15 | 400 |
|   | 410 | 0.15 | 300 |
| D | 490 | 0.24 | 300 |
|   | 520 | 0.26 | 220 |
| E | 610 | 0.35 | 180 |
|   | 640 | 0.40 | 120 |

The surface characteristic was measured for an area of 0.1 mm$^2$, by means of a three-dimensional roughness gage with a probe of 2.0-μm R, 2.5-μm D, and 30-mg probe pressure. The dynamic frictional force was measured by means of a dynamic friction gage, in which a support plate, fitted with a head, can rotate smoothly around an axis perpendicular to the plane of rotation of the media, so that the frictional force is detected from the angle of rotation of the support plate. The rotational frequency of the media was 300 rpm, and the head load was 12 gr. The durability test was conducted with the same rotational frequency (300 rpm) and the same head load (12 gr) as in the measurement of dynamic frictional force. The expiration of the life of the media was set at the point of time when the output was lowered to 70% of the initial output.

Based on these results, the density of projections on the height level corresponding to the 1.0% area ratio was correlative to the dynamic frictional force and durability. All of those media in which such density of projections was about 400 pieces/0.1 mm² or less exhibited the durability of 3,000,000 passes or more.

(EXAMPLE 5)

In Example 3, satisfactory results were obtained when the difference between the height levels corresponding to the area ratios of 1.0% and 5.0% was within 120 Å. The same satisfactory results can be obtained, however, if the difference between height levels corresponding to area ratios of 99.0% and 99.9% is within 100Å.

According to the present invention, the medium surface can enjoy the best configuration, which prevents lowering of the frequency response, and reduction or change of output during reproduction, which have been experienced with the prior art media. Thus, according to the invention, the media are improved considerably in reliability.

What is claimed is:

1. A perpendicular magnetic recording medium comprising:
   a base having a main surface; and
   a magnetic layer formed on the main surface, said magnetic layer having a recording surface formed with a number of fine projections, said projections being distributed so that the difference between a height level corresponding to an area ratio of 1.0%, obtained when the projections are cut by an imaginary plane parallel to the recording surface, and another height level corresponding to an area ratio of 99.0%, obtained in a like manner, ranges from 40 to 600 Å and the density of said projections rising above said height level corresponding to the area ratio of 1.0% is about 400/0.1 mm² or less.

2. The perpendicular magnetic recording medium according to claim 1, wherein said base is formed of a heat-resisting organic film.

3. The perpendicular magnetic recording medium according to claim 2, wherein said main surface of the base has projections similar to those on the recording surface of the magnetic layer.

4. The perpendicular magnetic recording medium according to claim 1, further comprising a protective layer of a substantially uniform thickness formed on the recording surface of the magnetic layer.

5. The perpendicular magnetic recording medium according to claim 1, wherein said magnetic layer is formed of a cobalt-based alloy, barium ferrite, or strontium ferrite.

6. The perpendicular magnetic recording medium according to claim 1, wherein none of said projections rise more than 700 Å above the height level corresponding to the 1.0% area ratio.

7. The perpendicular magnetic recording medium according to claim 1, wherein the difference between the height level corresponding to the 1.0% area ratio and a height level corresponding to an area ratio of 5.0% is within 120 Å.

* * * * *